US009573489B2

(12) United States Patent
Nakatsuka et al.

(10) Patent No.: US 9,573,489 B2
(45) Date of Patent: Feb. 21, 2017

(54) CONTROL DEVICE FOR RAILWAY POWER CONDITIONER AND CONTROL SYSTEM FOR RAILWAY POWER CONDITIONER

(71) Applicant: Hitachi, Ltd., Chiyoda-ku, Tokyo (JP)

(72) Inventors: Yasuhiro Nakatsuka, Tokyo (JP); Yasuhiro Imazu, Tokyo (JP); Osamu Sakuchi, Tokyo (JP); Masaya Ichinose, Tokyo (JP); Yasuhiro Kiyofuji, Tokyo (JP); Akira Bando, Tokyo (JP); Jun Narushima, Tokyo (JP); Toshihiko Usui, Tokyo (JP); Naomi Sato, Tokyo (JP); Masaki Uchita, Tokyo (JP); Rikiya Inoue, Tokyo (JP); Masahiko Honda, Tokyo (JP)

(73) Assignees: Hitachi, Ltd., Tokyo (JP); East Japan Railway Company, Tokyo (JP)

( * ) Notice: Subject to any disclaimer, the term of this patent is extended or adjusted under 35 U.S.C. 154(b) by 514 days.

(21) Appl. No.: 14/080,919

(22) Filed: Nov. 15, 2013

(65) Prior Publication Data

US 2014/0152087 A1 Jun. 5, 2014

(30) Foreign Application Priority Data

Nov. 30, 2012 (JP) ................. 2012-262067

(51) Int. Cl.
  *B60M 3/02* (2006.01)
  *H02J 3/28* (2006.01)
  *B60M 3/06* (2006.01)
(52) U.S. Cl.
  CPC ............ *B60M 3/02* (2013.01); *B60M 3/06* (2013.01); *H02J 3/28* (2013.01)
(58) Field of Classification Search
  None
  See application file for complete search history.

(56) References Cited

U.S. PATENT DOCUMENTS

2011/0043038 A1\* 2/2011 Tsutsumi ................. B60L 9/00
  307/48

FOREIGN PATENT DOCUMENTS

JP  4267132 B2  5/2009

OTHER PUBLICATIONS

Honda et al., Japanese-language with English abstract. "A Measurement of the Regenerative Braking Power in Joban Line and a Consideration of Efficient use of it," Institute of Electrical Engineers of Japan. Technical Society D, National Convention Record. Aug. 31, 2009. (four pages).

\* cited by examiner

*Primary Examiner* — Jared Fureman
*Assistant Examiner* — Aqeel Bukhari
(74) *Attorney, Agent, or Firm* — Crowell & Moring LLP

(57) ABSTRACT

Feeder sections to be a target of interchange are to be expanded in order to improve the effect of power interchange between feeders. A control device for railway power conditioner is connected to a first feeder connected to a load side of a transformer in a first railway substation including a transformer receiving power from a power grid, and a second feeder connected to a load side of a transformer in a second railway substation including a transformer receiving power from a power grid, and decides an amount of power interchanged between the first and second feeders. The control device decides the amount of power interchanged between the first and second feeders, using the received power in the first railway substation and power on the first feeder, and the received power in the second railway substation and power on the second feeder.

13 Claims, 7 Drawing Sheets

FIG. 4

| No. | POWER CONSUMED ON FEEDER LX1 SIDE $PA = PL1 - P1b$ | POWER CONSUMED ON FEEDER LX2 SIDE $PB = PL2 - P2B$ | ABSOLUTE VALUE OF POWER CONSUMED | AMOUNT OF POWER INTERCHANGED FROM FEEDER LX1 SIDE TO FEEDER LX2 SIDE [PC] | AMOUNT OF POWER PURCHASED AFTER INTERCHANGE | |
|---|---|---|---|---|---|---|
| | | | | | PL1 | PL2 |
| 1 | $0 \leq PA$ | $0 \leq PB$ | — | STOP | PA | PB |
| 2 | $0 \leq PA$ | $PB < 0$ | $|PA| \leq |PB|$ | $-PA$ | 0 | $PA+PB$ |
| | | | $|PB| < |PA|$ | $PB$ | $PA+PB$ | 0 |
| 3 | $PA < 0$ | $0 \leq PB$ | $|PA| \leq |PB|$ | $-PA$ | 0 | $PA+PB$ |
| | | | $|PB| < |PA|$ | $PB$ | $PA+PB$ | 0 |
| 4 | $PA < 0$ | $PB < 0$ | — | STOP | PA | PB |

FIG. 6

| RAILWAY SUBSTATION | SS3 | | SS1 | | SS2 | | SS4 | |
|---|---|---|---|---|---|---|---|---|
| POWER CONDITIONER | CON4 | CON3 | | CON1 | | CON2 | | CON5 |
| PURCHASE AMOUNT TARGET VALUE | PL35 | PL33 | PL13 | PL11 | PL21 | PL22 | PL42 | PL44 |
| SUM | PL3S=PL35+PL33 | | PL1S=PL13+PL11 | | PL2S=PL21+PL22 | | PL4S=PL42+PL44 | |
| CORRECTED TARGET VALUE | PC4 | PC3 | | PC1 | | PC2 | | PC5 |

CONTROL DEVICE FOR RAILWAY POWER CONDITIONER AND CONTROL SYSTEM FOR RAILWAY POWER CONDITIONER

BACKGROUND OF THE INVENTION

Field of the Invention

The present invention relates to a control system for railway power conditioner and particularly to a control system for railway power conditioner suitable for a broad range of railway feeder sections.

Description of Related Art

A railway power conditioner carries out power conversion according to the traveling status of a train supplied with power from a railway feeder thereof. The traveling status of the train (traveling modes) includes a power running mode in which electric power is consumed to accelerate the train body, a regenerative mode in which kinetic energy is returned to electric energy when the train body is decelerated, and coasting and stop modes in which neither power running nor regeneration is carried out. Of these traveling modes, in the power running mode and the regenerative mode, the railway power conditioner executes transfer of electric power between the feeder and the train.

The feeder is supplied with electric power from a power grid (charging system of railway substation).

As techniques for optimizing the amount of power on a railway feeder using a power conditioner, for example, Japanese Patent No. 4,267,132 and "Review on measurement and effective use of train regenerative power on Joban Line," the Institute of Electrical Engineers of Japan, Technical Society D, National Convention Record, Aug. 31, 2009, are known.

In short, in the conventional facilities, the transfer of electric power generated on the feeders between the two railway substations is adjusted by the power conditioner in the section post. These facilities and control technique are specified only for this section.

With a configuration in the related art, a target section is limited only to the section between a section post and a railway substation and there is a possibility that the opportunity of power interchange using the power conditioner may be limited. If this opportunity is limited, there is a problem that the effect of minimizing the amount of power consumed, which is the original purpose, is limited, too.

The section length of the feeders between the two railway substations is normally about several ten km. However, actual rails are often longer than that. Therefore, it is preferable to perform comprehensive control. For example, from a more comprehensive perspective, power interchange using a power conditioner, including power consumption by the substation inner loads, may be considered. Also, power interchange using a power conditioner with respect to other feeder sections that extend further may be considered.

Power interchange using a power conditioner is effective when one train operates in the power running mode while the other train operates in the regenerative mode. The duration of the time when multiple trains are on the rails within limited sections of the feeders, with one of the trains operating in the power running mode and with the other operating in the regenerative mode, is not very long. However, if the other feeder sections that extend further are included, it can be considered that the number of trains on the rails increases and that the duration of the time when there is a combination of trains, with one train operating in the power running mode and the other operating in the regenerative mode, becomes longer. Therefore, efficient operation can be expected.

SUMMARY OF THE INVENTION

In view of the foregoing, an object of the invention is to expand feeder sections that can become a target of interchange in order to improve the effect of power interchange between feeders.

According to an aspect of the invention, a control device for railway power conditioner is connected to a first feeder connected to a load side of a transformer in a first railway substation including a transformer receiving power from a power grid, and a second feeder connected to a load side of a transformer in a second railway substation including a transformer receiving power from a power grid, and decides an amount of power interchanged between the first and second feeders. The control device decides the amount of power interchanged between the first and second feeders, using the received power in the first railway substation and power on the first feeder, and the received power in the second railway substation and power on the second feeder.

According to another aspect of the invention, a control system for railway power conditioner includes: a first control device for railway power conditioner that is connected to a first feeder connected to a load side of a transformer in a first railway substation including a transformer receiving power from a power grid, and a second feeder connected to a load side of a transformer in a second railway substation including a transformer receiving power from a power grid, and that decides an amount of power interchanged between the first and second feeders; and a second control device for railway power conditioner that is connected to a third feeder connected to a load side of a transformer in a third railway substation including a transformer receiving power from a power grid, and a fourth feeder connected to the load side of the transformer in the first railway substation, and that decides an amount of power interchanged between the third and fourth feeders. The first control device for railway power conditioner decides the amount of power interchanged between the first and second feeders, using the received power in the first railway substation and power on the first feeder, and the received power in the second railway substation and power on the second feeder. The second control device railway power conditioner decides the amount of power interchanged between the third and fourth feeders, using the received power in the first railway substation and power on the fourth feeder, and the received power in the third railway substation and power on the third feeder.

The feeder power conditioner according to the invention can manage not only power supplied to the feeders but also internal power in the substations and power in feeder sections connected ahead of the railway substations. Therefore, there is an advantage that the range of target feeder sections for power interchange can be expanded. Also, a broader range can be optimized by using a comprehensive control device which corrects each interchange power target value, using power interchange information of adjacent conditioners of the same type.

BRIEF DESCRIPTION OF THE DRAWINGS

FIG. 4 shows a method for computing the amount of power interchanged in a power conditioner.

FIG. 6 shows an example of a method for calculating an interchanged power target value correction in a comprehensive control device.

DETAILED DESCRIPTION OF THE PREFERRED EMBODIMENTS

Embodiments of the invention will be described with reference to the drawings. According to the invention, the goal of realizing power interchange extensively to a feeder section that is further ahead of a railway substation is realized simply by making a minimum change, that is, by changing a measuring point, and without changing the system configuration.

To this end, according to the invention, received power PL1, PL2 to railway substations SS1, SS2 is grasped and managed via a direct or indirect measure.

Embodiments

First, a reference example will be described, and then characteristic portions of the invention will be described.

A railway power conditioner carries out power conversion according to the traveling status of a train supplied with power from a railway feeder thereof. The traveling status of the train (traveling modes) includes a power running mode in which electric power is consumed to accelerate the train body, a regenerative mode in which kinetic energy is returned to electric energy when the train body is decelerated, and coasting and stop modes in which neither power running nor regeneration is carried out. Of these traveling modes, in the power running mode and the regenerative mode, the railway power conditioner executes transfer of electric power between the feeder and the train.

Figure 3:
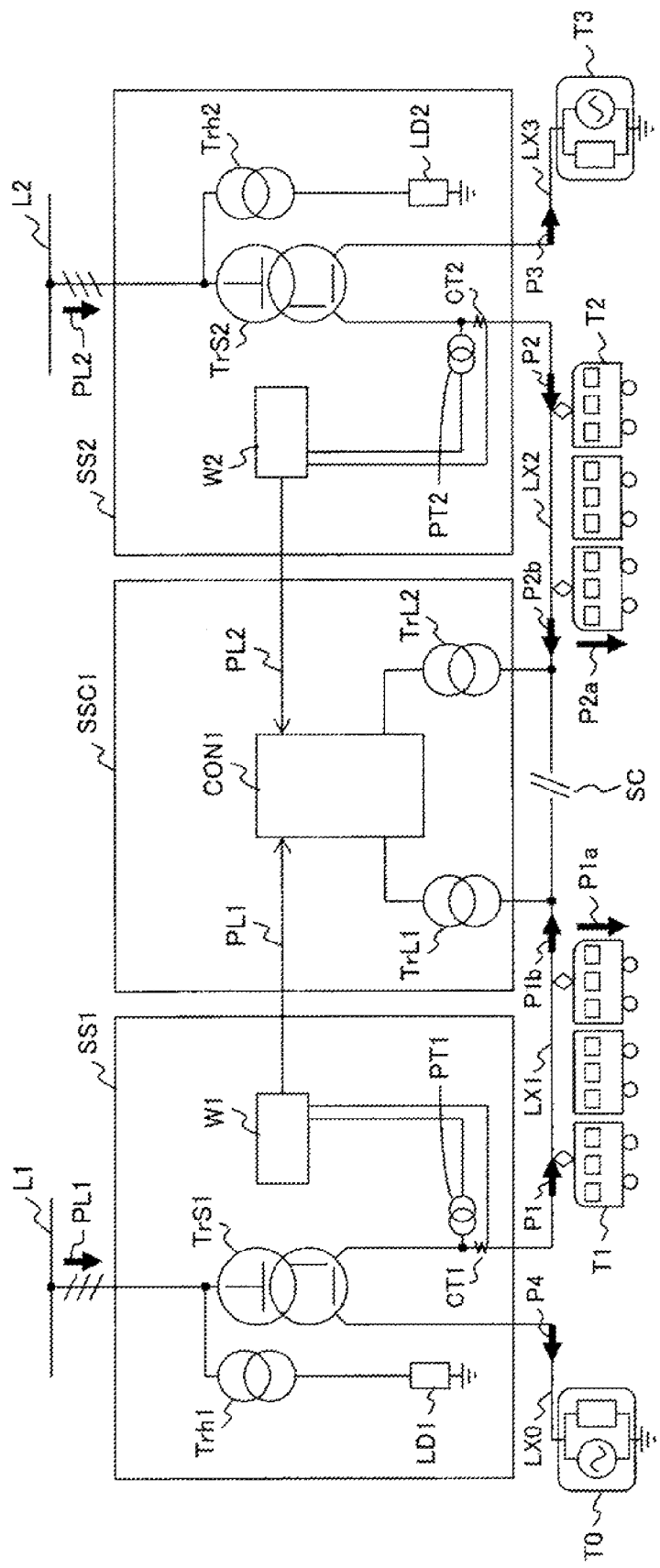
FIG. 3 shows a typical conventional configuration of power supply facilities for feeders.

The feeder is supplied with electric power from a power grid (charging system of railway substation). FIG. 3 shows a typical conventional configuration of electric power supply facilities for the feeder. In FIG. 3, T (T0, T1, T2, T3) is a carriage traveling on a feeder LX (LX0, LX1, LX2, LX3), and the feeder LX (LX0, LX1, LX2, LX3) is supplied with electric power from a power grid L (L1, L2) via a railway substation SS (SS1, SS2).

The feeder LX installed between the railway substations SS1, SS2 is separated into LX1 and LX2 at a section SC. The feeder LX1 side is supplied with power from the railway substation SS1, while the feeder LX2 side is supplied with power from the railway substation SS2. Also, a section post SSC1 having a power conditioner CON1 is installed between the two terminals of the section SC. The feeder power conditioner CON1 may correspond to a direct current feeder or an alternative current feeder. Here, an example with an alternative current feeder is explained.

In this way, the alternative current feeder LX (LX1 and LX2) is connected to the railway substations SS1, SS2 and the section post SSC1. Here, the section post SSC1 is a facility that divides the feeder into the adjacent feeder sections at the boundary between the feeder sections supplied with electric power from the railway substations SS1, SS2.

Since the adjacent feeders LX1 and LX2 receive the supply of energy from the different railway substations SS1, SS2, respectively, the feeders do not have the same voltage and phase and cannot be connected simply. The feeder power conditioner CON1 installed in the section post SSC1 is connected to the two adjacent feeders LX1 and LX2 and is used for the purpose of interchange of electric power without shorting the two feeders. The interchange of electric power by the feeder power conditioner CON1 installed in the section post SSC1 is advantageous in that the total amount of power consumed on the two feeders can be minimized by actuating the interchange according to the power running and regenerative power on each feeder.

The interchange of power running and regenerative power is possible only when power running and regenerative power are generated simultaneously in the adjacent feeder sections. Also, power supply from the railway substation is normally carried out on independent feeders in two directions toward sections posts situated in both directions from the railway substation.

The principal facilities are described above with reference to FIG. 3. Each facility is configured as follows. First, the railway substations SS1, SS2 installed between the power grids L1, L2 and the feeders LX1, LX2 will be described. The railway substations SS1, SS2 are formed mainly by a three-phase/two-phase conversion transformer TrS (TrS1, TrS2).

The three-phase/two-phase conversion transformer TrS (TrS1, TrS2) is, for example, a Scott-connection transformer in which a primary side thereof is connected to the three-phase power grid L1, L2 and a secondary side thereof is connected to the two-phase feeder LX0, LX1, LX2, LX3. In the railway substations SS1, SS2, substation inner load transformers Trh (Trh1, Trh2) for supplying power to substation inner loads LD1, LD2 are installed. Also, in the railway substations SS1, SS2, voltage transformers PT1, PT2, current transformers CT1, CT2, and power computing devices W1, W2 are provided for the control of the power conditioner CON1 in the section post SSC1, which will be described later.

The section post SSC1 mainly includes the power conditioner CON1. The power conditioner CON1 is connected between the two terminals of the section SC via the feeder transformers TrL (TrL1, TrL2) and controls the direction of transfer of electric power after adjusting the voltage and phase in this configuration. For power control, feeder power P1, P2 calculated by the power computing devices W1, W2 in the railway substations SS1, SS2 at both ends is used.

Next, the transfer of power on the train T on the feeder LX will be described. Here, the direction of power at the time of power running operation is regarded as positive and indicated by arrows. First, the train T1 on the feeder LX1 is supplied with the power P1 from the three-phase/two-phase conversion transformer TrS1. Power P1$a$ is consumed inside the train T1 and the remaining power P1$b$ is collected by the power conditioner CON1. The sum of these portions of power is zero. Similarly, the train T2 on the feeder LX2 is supplied with the power P2 from the three-phase/two-phase conversion transformer TrS2. Power P2$a$ is consumed inside the train T2 and the remaining power P2$b$ is collected by the power conditioner CON1.

When the train T on the feeder LX is performing regenerative operation, the power P1$a$, P2$a$ is generated inside the train (the arrows shown turn into the opposite direction) and sent toward the feeders LX1, LX2. In the coasting mode or stop mode, in which neither power running nor regeneration is carried out, the power P1*a*, P2*a* consumed inside the train (lighting or the like) is very small but is in the consumed state.

By the way, while FIG. 3 shows the state where the train T is on each feeder LX, generally, there are various states such as an off-rail state, a multiple on-rail state, and a one-side on-rail state. Also, even when a train is on the rail, the train operates in the various modes, that is, power running, regenerative, coasting, and stop. In practice, various different energy transfers take place on the feeder in accordance with the combinations of these states and modes.

The power conditioner CON1 adjusts power transfer between both ends of the section SC generated in accordance with the various states and modes. Thus, the interchanged power P1*b*, P2*b* from the power conditioner CON1 in the section post SSC1 is transferred to and from the feeders LX1, LX2 via the conversion transformers TrL1, TrL2.

In FIG. 3, the railway substations SS1, SS2 also supply power P3, P4 to the trains T0, T3 via the feeders LX0, LX3 which are further ahead. The railway substations SS1, SS2 receive power PL1, PL2 from the power grids L1, L2.

Figure 1:
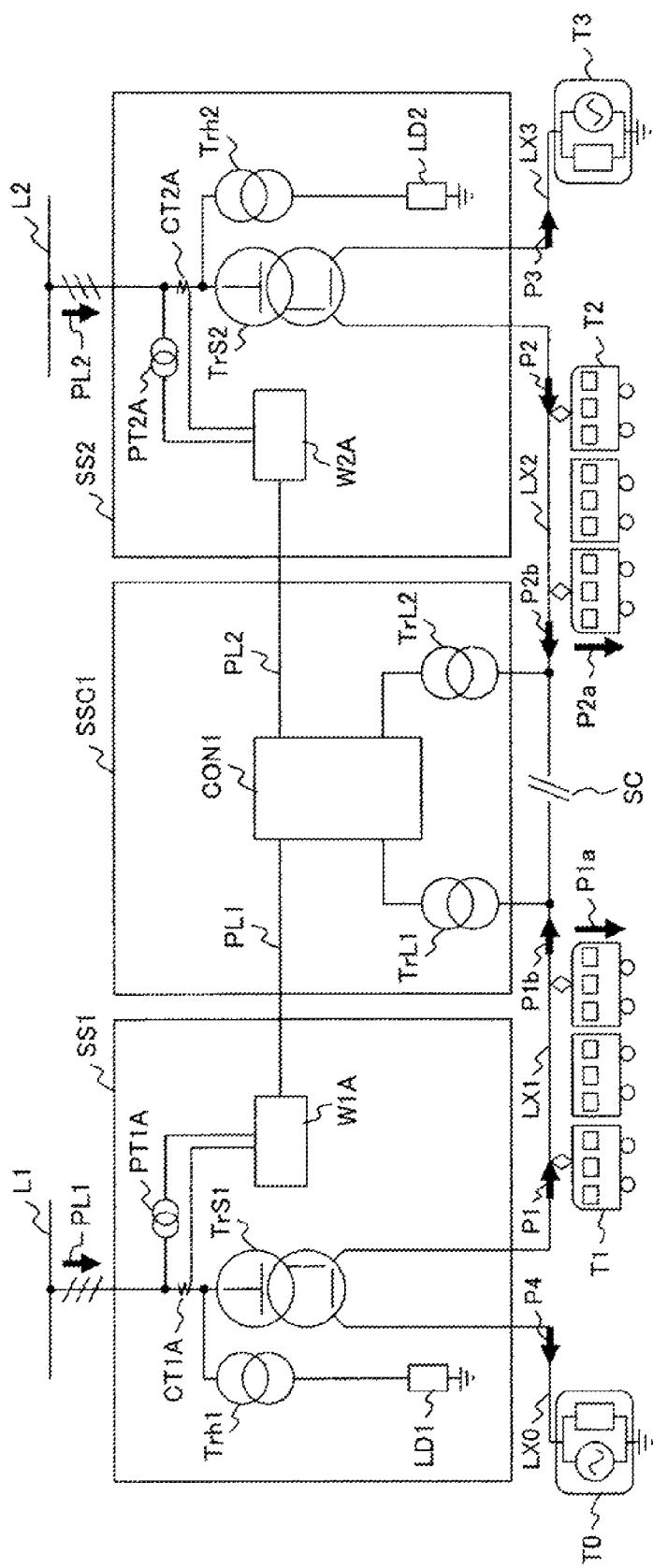
FIG. 1 shows the configuration of a control system for railway power conditioner according to a first embodiment of the invention.

FIG. 1 shows the configuration of a control system for railway power conditioner according to a first embodiment of the invention. In FIG. 1, the components are the same as in FIG. 3 shown as a conventional example, except for the power measuring point. Therefore, the power measuring point will be described mainly here. FIG. 1 shows an example in which the received power PL1, PL2 to the railway substations SS1, SS2 is directly acquired.

In short, in the conventional example of FIG. 3, the supply power P1, P2 to the feeders LX1, LX2 is measured. Therefore, the power computing devices W1, W2 acquire voltage and current from the voltage transformers PT1, PT2 and the current transformers CT1, CT2 installed on the feeders LX1, LX2.

In contrast to this, in the first embodiment of the invention, the received power PL1, PL2 to the railway substations SS1, SS2 is directly measured, as shown in FIG. 1. Therefore, power computing devices W1A, W2A acquires voltage and current from voltage transformers PT1A, PT2A and current transformers CT1A, CT2A installed on power receiving lines of the power grids L1, L2. The received power PL1, PL2 to the railway substations SS1, SS2 is transmitted to the power conditioner CON1 and used for control there.

Figure 2:
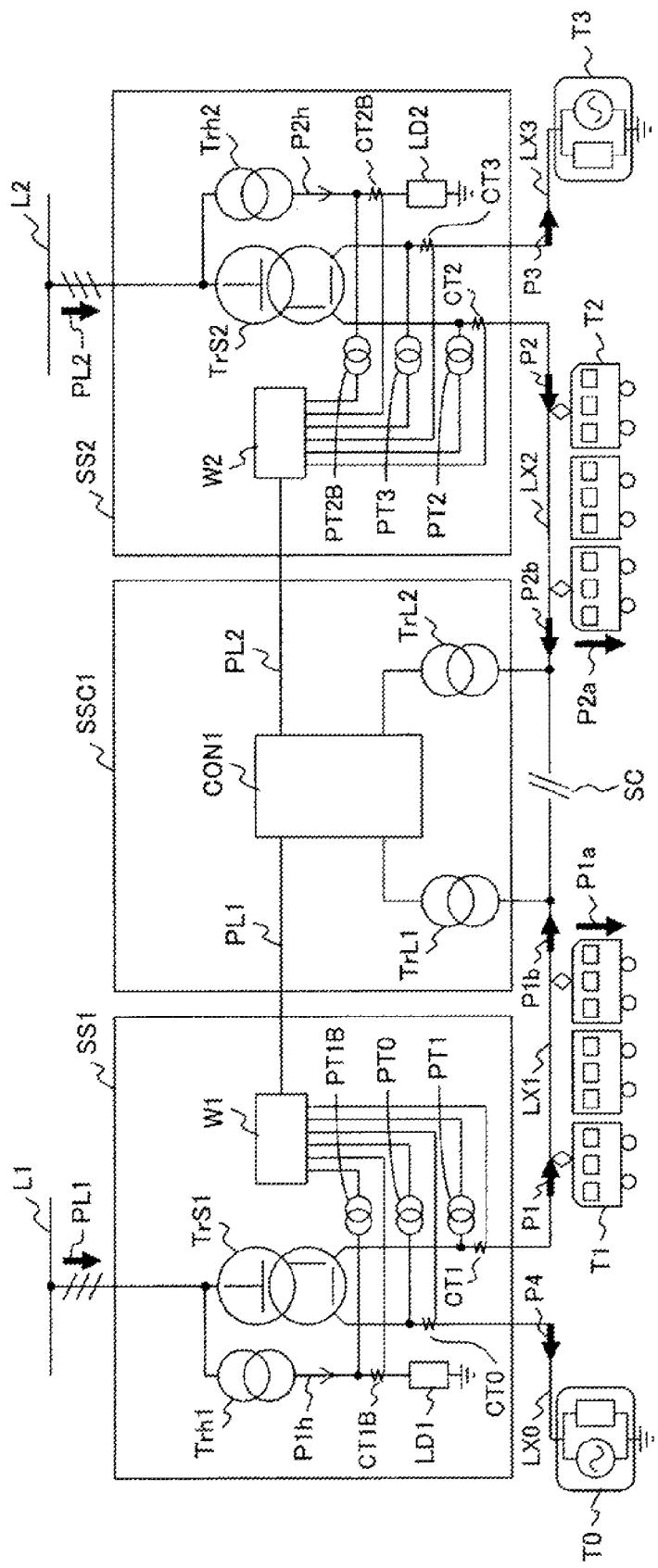
FIG. 2 shows the configuration of a control system for railway power conditioner according to a second embodiment of the invention.

FIG. 2 shows the configuration of a control system for railway power conditioner according to a second embodiment of the invention. In FIG. 2, the components are the same as in FIG. 3 shown as a conventional example, except for the power measuring point. Therefore, the power measuring point will be described mainly here. FIG. 2 shows an example in which the received power PL1, PL2 to the railway substations SS1, SS2 is indirectly acquired.

FIG. 2 shows an alternative method in the case where a part or all of the voltage transformers PT1A, PT2A and the current transformers CT1A, CT2A on the power receiving lines of the power grids L1, L2 cannot be installed, due to a certain restriction. Such a case can occur when the power computing devices W1, W2 are newly installed in an existing substation.

In indirect measurement, the secondary-side power of all the transformers connected to the power receiving lines of the power grids L1, L2 is measured and summed up, thus indirectly acquiring the received power PL1, PL2 to the railway substations SS1, SS2. Specifically, first, supply power P0, P1, P2, P3 to all the feeders LX0, LX1, LX2, LX3 connected to the secondary side of the three-phase/two-phase conversion transformer TrS (TrS1, TrS2) is measured. A voltage transformer PT0 and a current transformer CT0 to measure the supply power P0 to the feeder LX0, and a voltage transformer PT3 and a current transformer CT3 to measure the supply power P3 to the feeder LX3 are additionally installed in the facilities of FIG. 3. As the voltage transformers PT1, PT2 and the current transformers CT1, CT2 to acquire the supply power P1, P2 to the feeders LX1, LX2, the same transformers shown in FIG. 3 are used.

Also, voltage transformers PT1B, PT2B and current transformers CT1B, CT2B are additionally installed in order to measure secondary-side power P1*h*, P2*h* of the substation inner load transformers Trh1, Trh2.

The power computing device W1 calculates total received power PL1 in the railway substation SS1 as the total of the measured power P1, P0, P1*h*, and transmits the total received power PL1 to the power conditioner CON1. The power computing device W2 calculates total received power PL2 in the railway substation SS2 as the total of the measured power P2, P3, P2*h*, and transmits the total received power PL2 to the power conditioner CON1. By using the measurement results of all the measuring units PT, CT, each power distributed via the transformers Tr, Trh can be measured separately. Therefore, the sums of the power can be used as the amounts of power PL1, PL2.

Although not shown, even if a part of the measuring units is unable to measure, the power supply excluding the amount of power flowing to that portion can be included in the calculation of the amount of power interchanged. Moreover, if a part of PT1A, CT1A, PT2A, CT2A of FIG. 1 is available, a supplement can be made. That is, if the voltage transformers PT1A, PT2A of FIG. 1 are available, all or apart of the current transformers CT1, CT2, CT0, CT3, CT1B, CT2B of FIG. 2 can be used for estimation. If the current transformers CT1A, CT2A of FIG. 1 are available, all or a part of the voltage transformers PT1, PT2, PT0, PT3, PT1B, PT2B of FIG. 2 can be used for estimation.

Through the foregoing measurement, the power at four places is provided to the power conditioner CON1 in the section post SSC. This power is the received power PL1, PL2 to the railway substations SS1, SS2 and the power P1*b*, P2*b* flowing into the power conditioner CON1 from the feeders LX1, LX2. Using this power information, the power conditioner CON1 decides the amount of power interchanged. However, with respect to the received power PL1, PL2 and the inflow power P1*b*, P2*b*, the directions of the arrows in FIGS. 1 and 2 are considered positive.

FIG. 4 shows an example of a method for calculating the amount of power interchanged. In FIG. 4, in the sections along the vertical axis, four cases in rows 101 to 104 are shown as cases of various operation statuses of the feeders LX1, LX2. Along the horizontal axis, power consumed PA on the feeder LX1 side (column 105), power consumed PB on the feeder LX2 side (column 106), comparison in magnitude of absolute values of power consumed (column 107), amount of power interchanged PC from the feeder LX1 side to the feeder LX2 side (column 108), and the amount of power purchased after interchange (column 109) are shown.

According to this table, the power consumed PA on the feeder LX1 side in the column 105 is PA=PL1−P1*b* and the power consumed PB on the feeder LX2 side in the column 106 is PB=PL2−P2*b*. The four cases in the rows 101 to 104 are defined by combinations of positive-negative relations between the power consumed PA and PB. The case 1 is where both PA and PB are positive. The case 2 is where PA is positive and PB is negative. The case 3 is where PA is negative and PB is positive. The case 4 is where both PA and PB are negative.

The state where PA and PB are positive is where inputted power is not completely consumed. The state where PA and PB are negative is where power exceeding inputted power is collected. Therefore, in the state where both PA and PB are positive, consumption is insufficient on both of the feeders LX1, LX2 and therefore there is no need for power interchange in this section. Meanwhile, in the state where both PA and PB are negative, power is collected on both of the feeders LX1, LX2 and therefore there is no need for power interchange in this section.

In such cases where PA and PB have the same sign, the sum of the received power PL1, PL2 is unchanged even if power interchange is carried out. In such cases, the power conditioner CON1 can not only stop power interchange but also, for example, turn the power element arranged inside the power conditioner CON1 into a standby state by switching on a gate blocking state, and thus reduce the amount of excess power consumed. Even in the case where PA and PB have the opposite signs, if the amount of power interchanged is smaller than a predetermined value, the sum of the received power PL1, PL2 is unchanged even if power interchange is carried out. In such a case, too, the power conditioner CON1 can not only stop power interchange but also, for example, turn the power element arranged inside the power conditioner CON1 into the standby state by switching on the gate blocking state, and thus reduce the amount of excess power consumed.

In view of the above, in the cases 1 and 4 where the power consumed PA, PB have the same sign, power interchange control is stopped (column 108). The amount of power purchased in this case is the power consumed PA, PB, respectively.

Meanwhile, when the power consumed PA, PB have the opposite signs, it means that collected power is generated on one side while there is a load on the other side that consumes the collected power. Therefore, in this example, the cases 2 and 3 in the rows 102 and 103 are subdivided. As shown in the column 107, four cases in a row 102A, a row 102B, a row 103A, and a row 103B are created based on the comparison in magnitude of the absolute values of the power consumed PA, PB. Then, the amount of power corresponding to the smaller absolute value is interchanged from the negative (regenerative) side to the positive (power running) side.

The rows 102A and 103A are examples in which the absolute value of the power consumed PA is smaller than the absolute value of PB. The rows 102B and 103B are examples in which the absolute value of the power consumed PB is smaller than the absolute value of PA. In the former examples, the amount of power PA corresponding to the smaller absolute value is taken as the amount of power interchanged. In the latter examples, the amount of power PB corresponding to the smaller absolute value is taken as the amount of power interchanged. As for the direction of power interchange, in the rows 102A and 102B, power is interchanged from the feeder LX2 side, where the sign is negative (regenerative), to the feeder LX1 side, where the sign is positive (power running). In the rows 103A and 103B, power is interchanged from the feeder LX1 side, where the sign is negative (regenerative), to the feeder LX2 side, where the sign is positive (power running).

As a result, in the cases in the rows 102A and 103A, the ultimate amount of power purchased after interchange is PL2=PA+PB on the railway substation SS2 side and PL1=0 on the railway substation SS1 side. In the cases in the rows 102B and 103B, the ultimate amount of power purchased after interchange is PL2=0 on the railway substation SS2 side and PL1=PA+PB on the railway substation SS1 side.

According to the approach of FIG. 4, since the receiving end power PL1, PL2 of the railway substations SS1, SS2 is evaluated, comprehensive power interchange is carried out in consideration of the amount of power consumed by the substation inner loads LD1, LD2 and the state of power consumption on the extended feeders LX0, LX3.

In FIGS. 1 and 2, effective use of power in a broad range is realized via power interchange between the adjacent railway substations SS1, SS2. However, the technique can also be applied to comprehensive operation including more railway substations.

Figure 5:
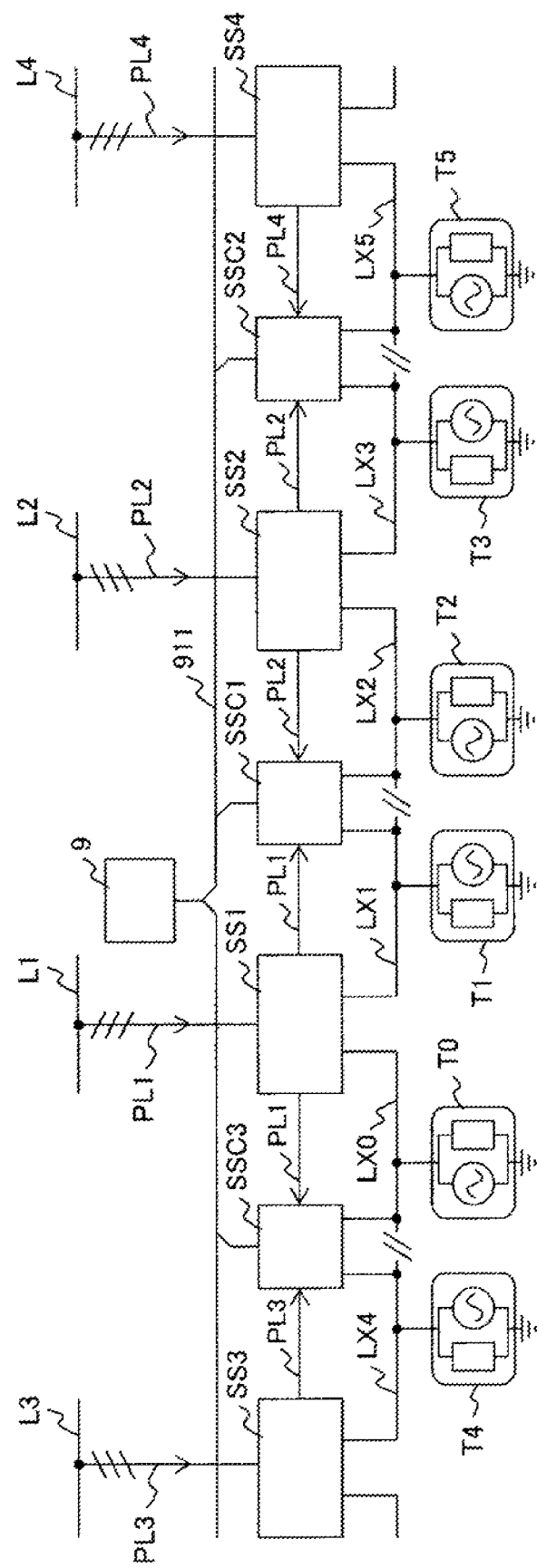
FIG. 5 shows the control system configuration in the case where the technique is applied extensively to an adjacent railway substation.

FIG. 5 shows an example in which the application range shown in FIGS. 1 and 2 (between the railway substations SS1, SS2) is extended to further adjacent railway substations SS3, SS4. The respective section posts SSC1, SSC2, SSC3 are connected to a broad-range comprehensive control device 9 via a signal line 911 and each of the section posts notifies the comprehensive control device 9 of information such as the power interchange target value thereof. The comprehensive control device 9 carries out optimization calculation and designates a correction value for each interchanged power target value.

FIG. 6 shows an example of a method for calculating the correction value for the interchanged power target value in the comprehensive control device 9. In FIG. 6, the amount of power purchased after interchange that is found at each section post SSC1, SSC2, SSC3 is acquired for the calculation here. The amount of power purchased after interchange is the values in the rows 109A, 109B in FIG. 4. In FIG. 4, the received power in the railway substation SS1 calculated at the section post SSC1 is PL1, and similarly the received power in the railway substation SS2 calculated at the section post SSC 1 is PL2. In practice, PL1, PL2 are individual values found for each of the cases 1 to 4 in FIG. 4. PL1, PL2 are used as representative symbols of these values.

According to the approach of FIG. 6, in the top row, the railway substations SS are shown laterally in order of the arrangement shown in FIG. 5 (SS3, SS1, SS2, SS4). In the next row, the power conditioners CON in the section posts SSC are shown laterally in order of the arrangement shown in FIG. 5 (CON3, CON1, CON2).

In the third row from the top in FIG. 6, the amount of power purchased after interchange is shown as the purchase amount target value. When this approach is applied to the case of the power conditioner CON1, PL21 is shown in the right section below CON1 as the amount of power purchased on the railway substation SS2 side, and PL11 is shown in the left section below CON1 as the amount of power purchased on the railway substation SS1 side. PL21 means the received power in the railway substation SS2 calculated at the section post SSC1. Similarly, PL11 means the received power in the railway substation SS1 calculated at the section post SSC1. These PL11, PL21 are values that are reported to the comprehensive control device 9 through the calculation in the power conditioner CON1.

Similar reports are made in the power conditioner CON in the adjacent feeder sections. For example, the power conditioner CON3 in the section post SSC3 reports PL13 as the amount of power purchased on the railway substation SS1 side, as shown in the right section below CON3 in FIG. 6, and reports PL33 in the left section below CON3 as the amount of power purchased on the railway substation SS3.

In this way, in the third row from the top in FIG. 6, the amount of power purchased after interchange in the railway substations SS at both ends calculated at each section post SSC is shown as the purchase amount target value. According to this, for example, the value PL11 calculated in the power conditioner CON1 and the value PL13 calculated in the power conditioner CON3 are obtained as the purchase amount target values of the railway substation SS1.

In the fourth row in FIG. 6, the sum of the purchase amount target values calculated in the adjacent power conditioners CON is found for each railway substation SS. For example, in the case of the railway substation SS1, PL1S is calculated as the sum of the value PL11 calculated in the power conditioner CON1 and the value PL13 calculated in the power conditioner CON3. Similarly, in the case of the railway substation SS2, PL2S is calculated as the sum of the value PL21 calculated in the power conditioner CON1 and the value PL22 calculated in the power conditioner CON2. The reason for doing this is that the amounts of power purchased after interchange in the railway substation SS that are calculated in the adjacent power conditioners CON may differ from each other.

In the bottom row in FIG. 6, a post-correction target value in each power conditioner CON that is ultimately decided is described. The post-correction target value is decided in the processing of FIG. 7 using the sum of the purchase amount target values calculated in the adjacent power conditioners CON.

Figure 7:
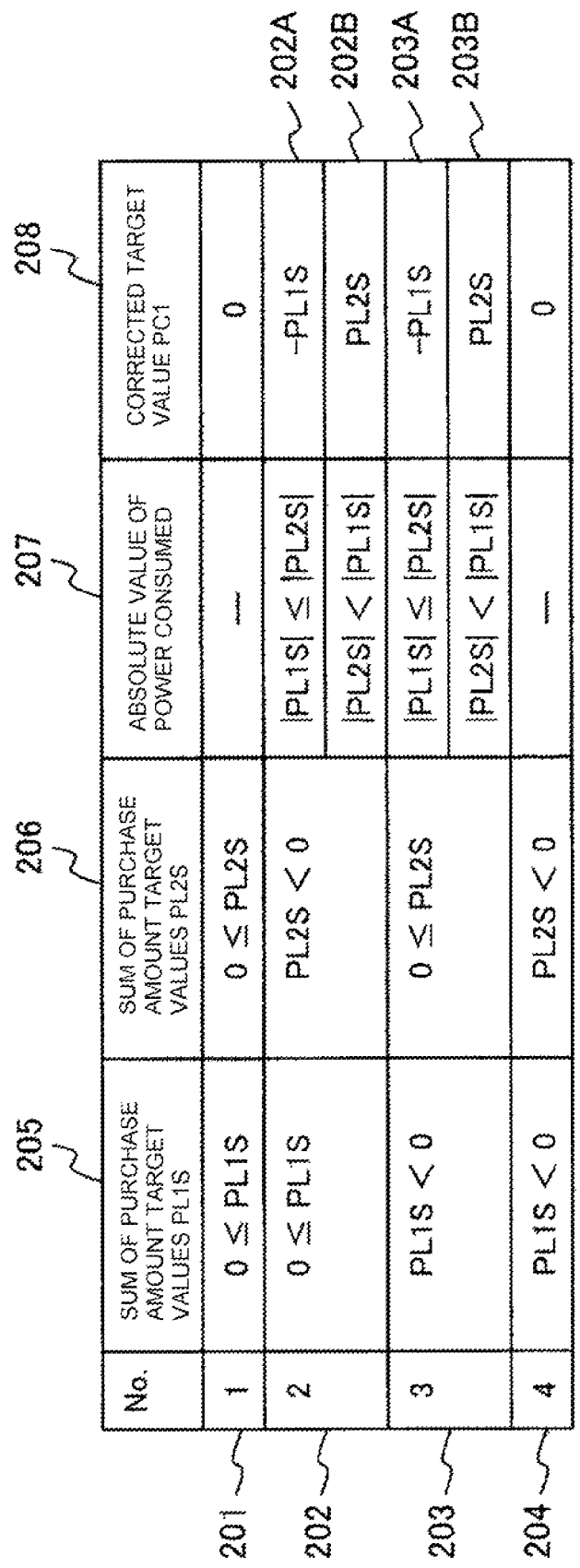
FIG. 7 shows an example of a post-correction target value decision procedure in each power conditioner.

FIG. 7 shows a procedure for deciding the post-correction target value in each power conditioner CON. Here, the power conditioner CON1 is used as an example. However, this approach is also applied to the other power conditioners CON. To decide the post-correction target value in the power conditioner CON, the sum of the purchase amount target values in the railway substations at both ends of this conditioner is used. In the case of the power conditioner CON1, PL1S (=PL13+PL1) and PL2S (=PL21+PL22) in FIG. 6 are used. The approach of FIG. 7 is basically the same as the determination processing of FIG. 4 and therefore will be described briefly here.

In FIG. 7, in a row 205 along the horizontal axis, the sum PL1S of the purchase amount target values found with respect to the railway substation SS1 is shown. In a row 206, the sum PL2S of the purchase amount target values found with respect to the railway substation SS2 is shown. In each section along the vertical axis, four cases are separately shown in rows 201 to 204 according to the positive and negative signs of PL1S and PL2S. In a row 207 along the horizontal axis, the absolute value of power consumed in each case is shown. In a row 208, a corrected target value PC1 that is ultimately decided in each case is shown.

The case 1 is where both PL1S and PL2S are positive. The case 2 is where PL1S is positive and PL2S is negative. The case 3 is where PL1S is negative and PL2S is positive. The case 4 is where both PL1S and PL2S are negative.

The state where PL1S and PL2S are positive is where inputted power is not completely consumed. The state where PL1S and PL2S are negative is where power is supplied to the power grid side. Therefore, in the state where both PL1S and PL2S are positive, consumption is insufficient on both of the feeders LX1, LX2 and therefore there is no need for power interchange in this section. Meanwhile, in the state where both PL1S and PL2S are negative, power is collected on both of the feeders LX1, LX2 and therefore there is no need for power interchange in this section.

In such cases where PL1S and PL2S have the same sign, the sum of the received power PL1, PL2 is unchanged even if power interchange is carried out. In such cases, the power conditioner CON1 can not only stop power interchange but also, for example, turn the power element arranged inside the power conditioner CON1 into a standby state by switching on a gate blocking state, and thus reduce the amount of excess power consumed. Even in the case where PL1S and PL2S have the opposite signs, if the amount of power interchanged is smaller than a predetermined value, the sum of the received power PL1, PL2 is unchanged even if power interchange is carried out. In such a case, too, the power conditioner CON1 can not only stop power interchange but also, for example, turn the power element arranged inside the power conditioner CON1 into the standby state by switching on the gate blocking state, and thus reduce the amount of excess power consumed.

In view of the above, in the cases 1 and 4 where the sums PL1S, PL2S of the purchase amount target values have the same sign, power interchange control is stopped (column 208). The corrected target value PC1 (the amount of power interchanged from the feeder LX1 side to the feeder LX2 side) in this case is 0.

Meanwhile, when the sums PL1S, PL2S of the purchase amount target values have the opposite signs, it means that collected power is generated on one side while there is a load on the other side that consumes the collected power. Therefore, in this example, the cases 2 and 3 in the rows 202 and 203 are subdivided. As shown in the column 207, four cases in a row 202A, a row 202B, a row 203A, and a row 203B are created based on the comparison in magnitude of the absolute values of the sums PL1S, PL2S of the purchase amount target values. Then, the amount of power corresponding to the smaller absolute value is interchanged from the negative (regenerative) side to the positive (power running) side.

The rows 202A and 203A are examples in which the absolute value of the sum PL1S of the purchase amount target values is smaller than the absolute value of PL2S. The rows 202B and 203B are examples in which the absolute value of the sum PL2S of the purchase amount target values is smaller than the absolute value of PL1S. In the former examples, the sum PL1S of the purchase amount target values corresponding to the smaller absolute value is taken as the amount of power interchanged. In the latter examples, the sum PL2S of the purchase amount target values corresponding to the smaller absolute value is taken as the amount of power interchanged. As for the direction of power interchange, in the rows 202A and 202B, power is interchanged from the feeder LX2 side, where the sign is negative (regenerative), to the feeder LX1 side, where the sign is positive (power running). In the rows 203A and 203B, power is interchanged from the feeder LX1 side, where the sign is negative (regenerative), to the feeder LX2 side, where the sign is positive (power running).

Based on the power interchange target value of each section post shown in FIG. 7, for example, the power conditioner CON1 can minimize the amount of power in one of the railway substations SS1, SS2. The comprehensive control device 9 calculates an interchanged power target value to optimize the amount of power in the other railway substation with the further adjacent feeder. Thus, power consumption can be optimized in all the areas managed by the comprehensive control device 9.

What is claimed is:

1. A control device for railway power conditioner which is connected to a first feeder connected to a load side of a transformer in a first railway substation including a transformer receiving power from a power grid, and a second feeder connected to a load side of a transformer in a second railway substation including a transformer receiving power from a power grid, and which decides an amount of power interchanged between the first and second feeders,
wherein the amount of power interchanged between the first and second feeders is decided by comparing a difference between the received power in the first railway substation and power on the first feeder, and a difference between the received power in the second railway substation and power on the second feeder.

2. The control device for railway power conditioner according to claim 1, wherein the received power in the railway substation is obtained from a measuring unit installed at a power receiving end thereof.

3. The control device for railway power conditioner according to claim 1, wherein the received power in the railway substation is obtained from a measuring unit installed on the load side of the transformer receiving power from the power grid.

4. The control device for railway power conditioner according to claim 1, wherein the amount of power interchanged between the first and second feeders is decided by comparing a difference between the received power in the first railway substation and the power on the first feeder and a difference between the received power in the second railway substation and the power on the second feeder.

5. The control device for railway power conditioner according to claim 1, wherein the transformer is a three-phase/two-phase conversion transformer that converts three phases into two phases, and the two phases on the load side thereof is connected to the feeder.

6. The control device for railway power conditioner according to claim 1, wherein an amount of power purchased after interchange in the first and second railway substations is decided, using the amount of power interchanged between the first and second feeders.

7. The control device for railway power conditioner according to claim 4, wherein power interchange is stopped when the difference between the received power in the first railway substation and the power on the first feeder and the difference between the received power in the second railway substation and the power on the second feeder have the same polarity, or when these differences have the opposite polarities but have a small absolute value.

8. The control device for railway power conditioner according to claim 7, wherein when power interchange is carried out using a power conditioner, in an operation to stop the power interchange, a circuit breaker connecting the feeder or connecting a transformer for the power conditioner with the feeder is turned on to stand by in a gate blocking state.

9. The control device for railway power conditioner according to claim 8, wherein, during a standby state, a direct current voltage is maintained at a higher level than a charging voltage of a grid voltage, by a charger device of a power conditioner direct current circuit.

10. A control system for railway power conditioner comprising: a first control device for railway power conditioner which is connected to a first feeder connected to a load side of a transformer in a first railway substation including a transformer receiving power from a power grid, and a second feeder connected to a load side of a transformer in a second railway substation including a transformer receiving power from a power grid, and which decides an amount of power interchanged between the first and second feeders; and a second control device for railway power conditioner which is connected to a third feeder connected to a load side of a transformer in a third railway substation including a transformer receiving power from a power grid, and a fourth feeder connected to the load side of the transformer in the first railway substation, and which decides an amount of power interchanged between the third and fourth feeders,
wherein the first control device for railway power conditioner decides the amount of power interchanged between the first and second feeders by comparing a difference between the received power in the first railway substation and power on the first feeder, and a difference between the received power in the second railway substation and power on the second feeder, and
the second control device railway power conditioner decides the amount of power interchanged between the third and fourth feeders by comparing a difference between the received power in the first railway substation and power on the fourth feeder, and a difference between the received power in the third railway substation and power on the third feeder.

11. The control system for railway power conditioner according to claim 10, wherein the received power in the railway substation is obtained from a measuring unit installed at a power receiving end thereof.

12. The control system for railway power conditioner according to claim 10, wherein the received power in the railway substation is obtained from a measuring unit installed on the load side of the transformer receiving power from the power grid.

13. The control system for railway power conditioner according to claim 10, wherein received power after interchange is found for each railway substation, based on the amount of power interchanged between two feeders connected between adjacent railway substations and the received power in each railway substation, and a sum of the two received powers after interchange that are found is calculated for each railway substation,
the sum of the two received powers after interchange that is calculated for the first railway substation and the sum of the two received powers after interchange that is calculated for the second railway substation are compared, and the amount of power interchanged between the first and second feeders is controlled by the first control device for railway power conditioner, and
the sum of the two received powers after interchange that is calculated for the first railway substation and the sum of the two received powers after interchange that is calculated for the third railway substation are compared, and the amount of power interchanged between the third and fourth feeders is controlled by the second control device for railway power conditioner.

* * * * *